US008868336B2

(12) United States Patent
Suzuno

(10) Patent No.: US 8,868,336 B2
(45) Date of Patent: Oct. 21, 2014

(54) INFORMATION PROCESSING APPARATUS, PROGRAM, INFORMATION PROCESSING METHOD, AND MAP DATA

(75) Inventor: Satoshi Suzuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 653 days.

(21) Appl. No.: 12/948,096

(22) Filed: Nov. 17, 2010

(65) Prior Publication Data

US 2011/0161007 A1    Jun. 30, 2011

(30) Foreign Application Priority Data

Dec. 28, 2009    (JP) ................................. 2009-298148

(51) Int. Cl.
*G06F 19/00*    (2011.01)
(52) U.S. Cl.
USPC .......................................... 701/454; 701/461
(58) Field of Classification Search
USPC ......... 701/400, 408, 409, 410, 411, 431, 454, 701/461, 491
See application file for complete search history.

(56) References Cited

U.S. PATENT DOCUMENTS

| | | | |
|---|---|---|---|
| 2009/0177382 A1* | 7/2009 | Alles et al. ..................... | 701/208 |
| 2010/0100319 A1* | 4/2010 | Trinko et al. ................... | 701/212 |
| 2010/0146436 A1* | 6/2010 | Jakobson et al. ............... | 715/800 |
| 2010/0268460 A1* | 10/2010 | Wan et al. ..................... | 701/210 |
| 2010/0321490 A1* | 12/2010 | Chen et al. ..................... | 348/118 |
| 2011/0063301 A1* | 3/2011 | Setlur et al. ................... | 345/441 |
| 2011/0087425 A1* | 4/2011 | Deng et al. ..................... | 701/200 |
| 2011/0122797 A1* | 5/2011 | Sheha et al. ................... | 370/254 |
| 2011/0130949 A1* | 6/2011 | Arrasvuori ..................... | 701/200 |
| 2011/0130955 A1* | 6/2011 | Pu et al. ......................... | 701/201 |

FOREIGN PATENT DOCUMENTS

JP    2009-109643    5/2009

* cited by examiner

*Primary Examiner* — Ronnie Mancho
(74) *Attorney, Agent, or Firm* — Oblon, Spivak, McClelland, Maier & Neustadt, L.L.P.

(57) ABSTRACT

An information processing apparatus including a position information allocation unit for allocating position information to plural spots on a deformed map; and an interpolation unit for interpolating position information of each spot on the deformed map on the basis of the position information allocated to the plural spots and locations of the plural spots on the deformed map.

9 Claims, 15 Drawing Sheets

FIG. 1
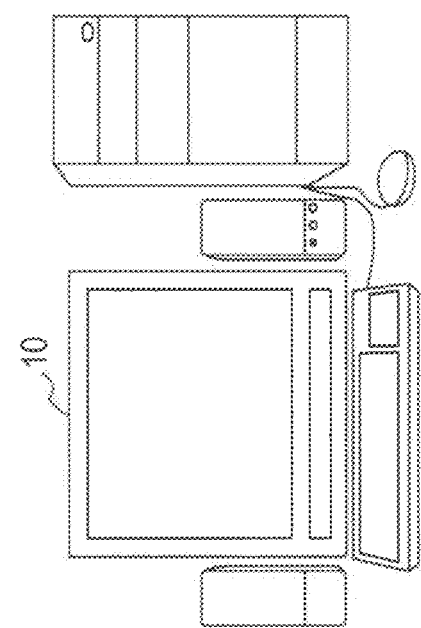
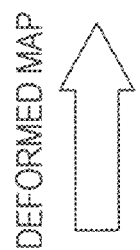
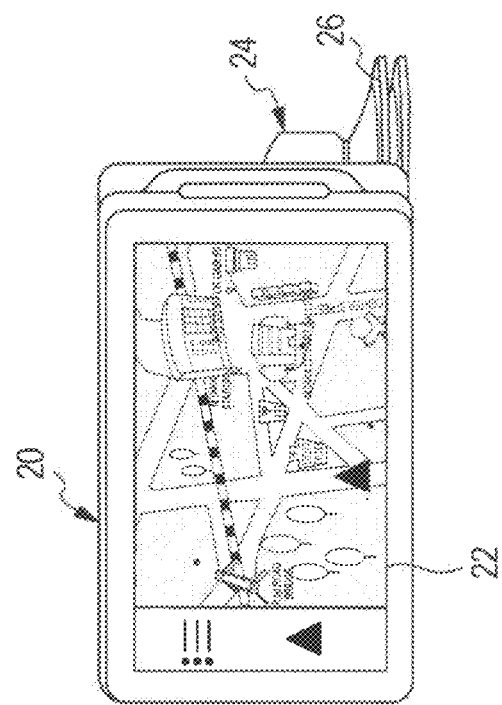

FIG. 2
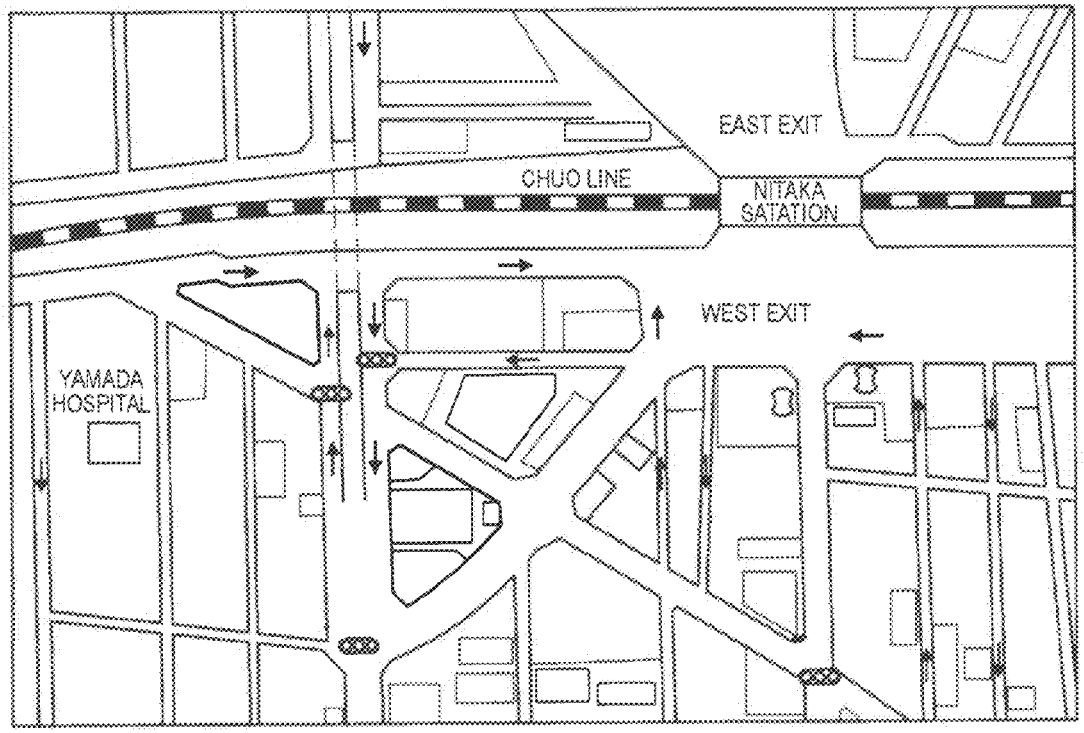
<ORDINARY MAP>
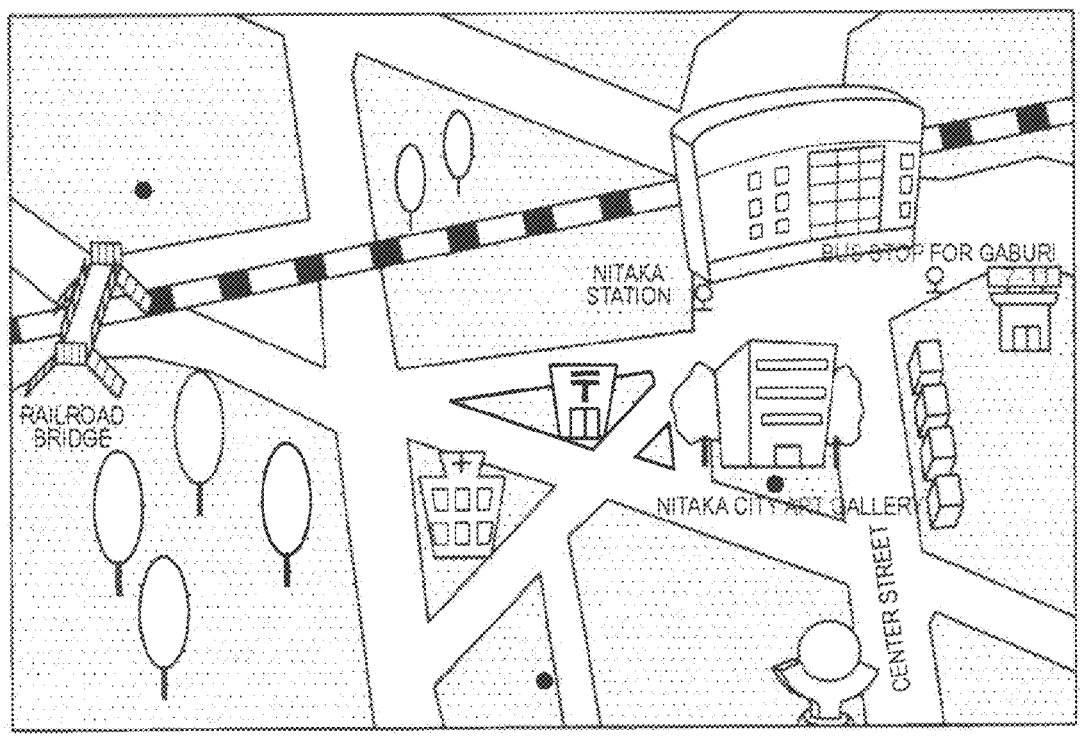
<DEFORMED MAP>

FIG. 8
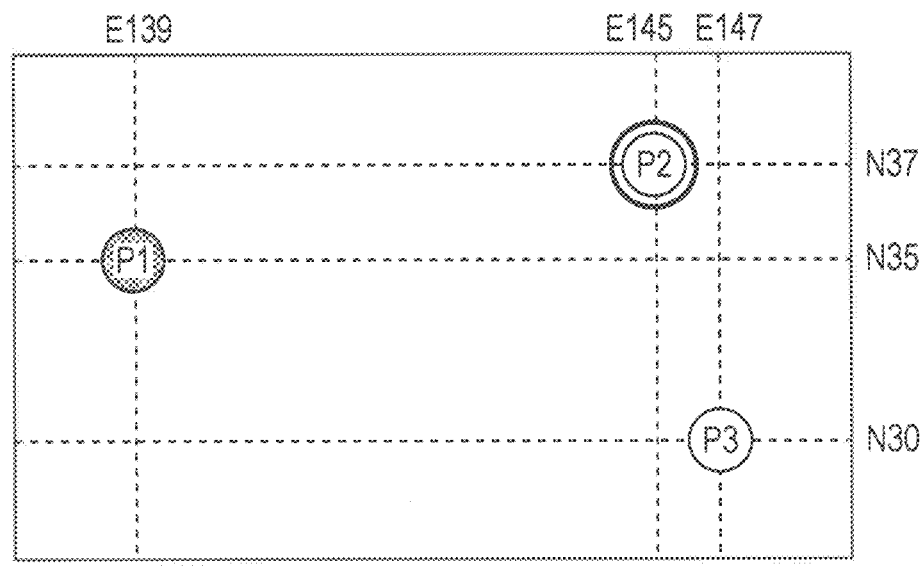
 REFERENCE SPOT
 SELECTED SPOT
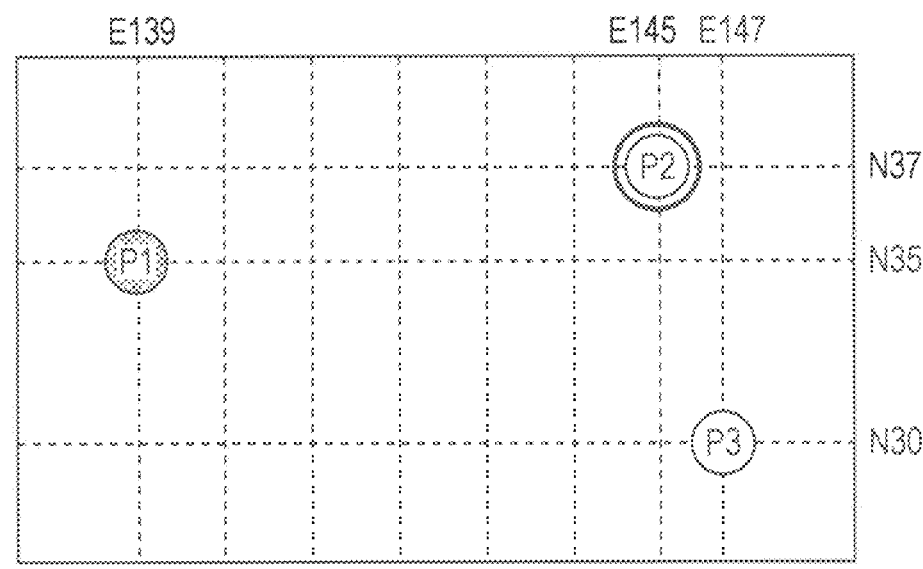

FIG. 9
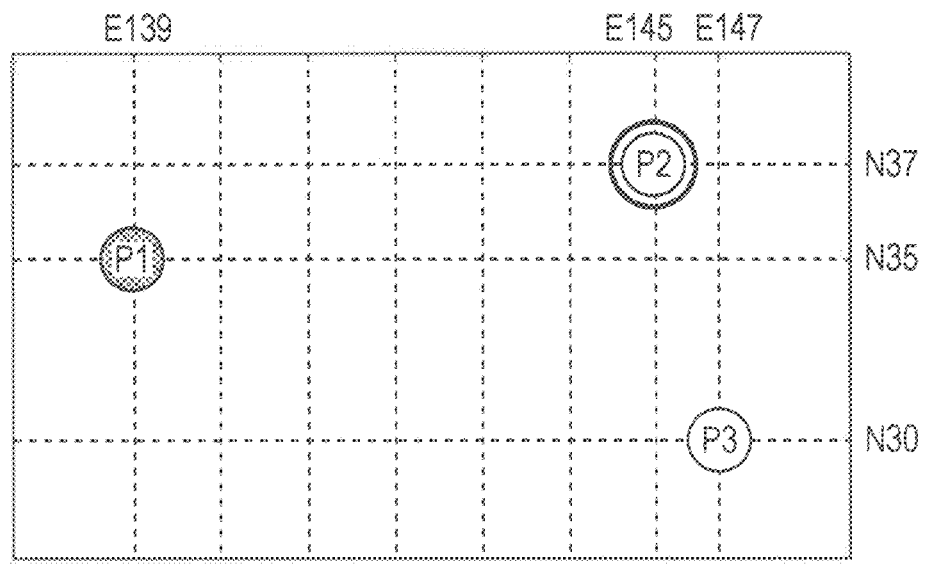
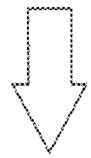
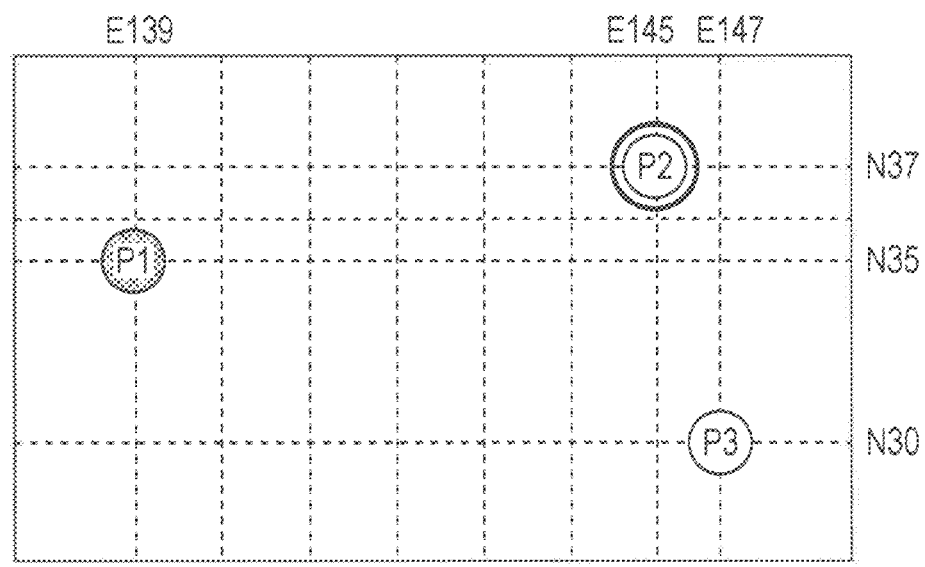

FIG. 10
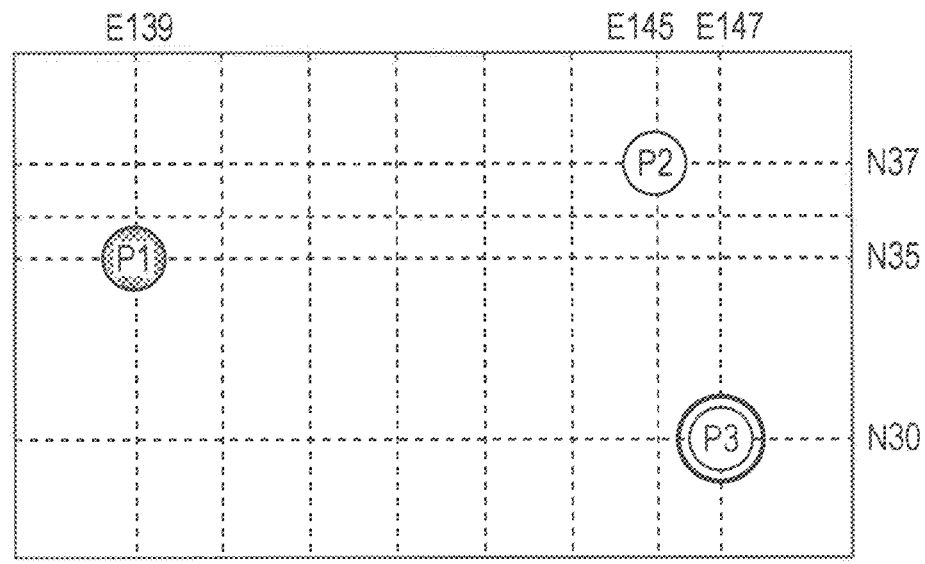
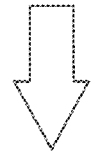
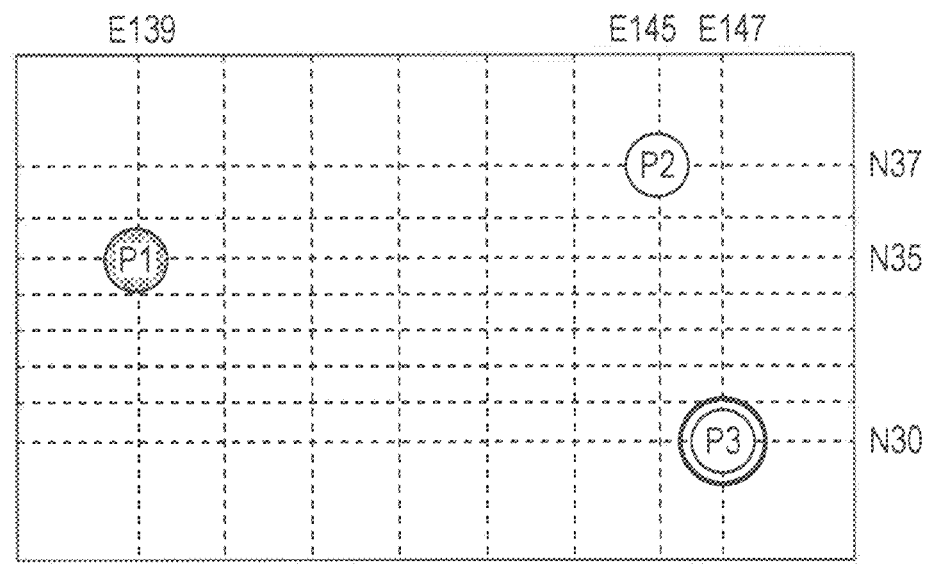

FIG. 11
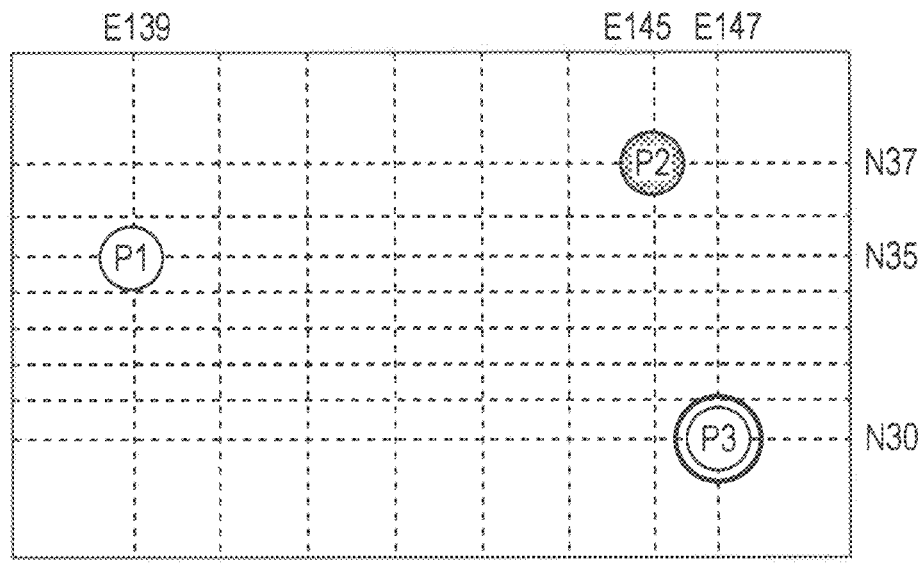
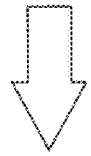
REFERENCE SPOT
SELECTED SPOT
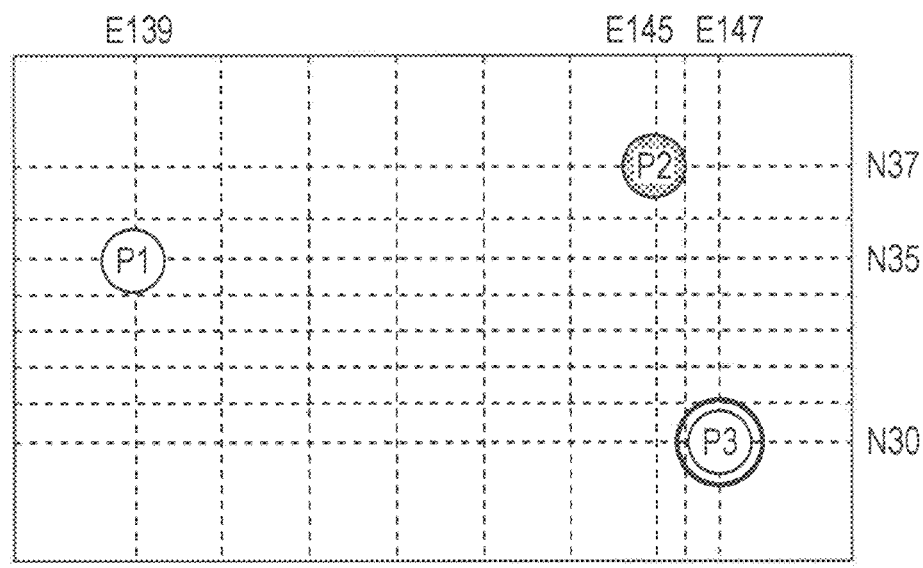

FIG. 12
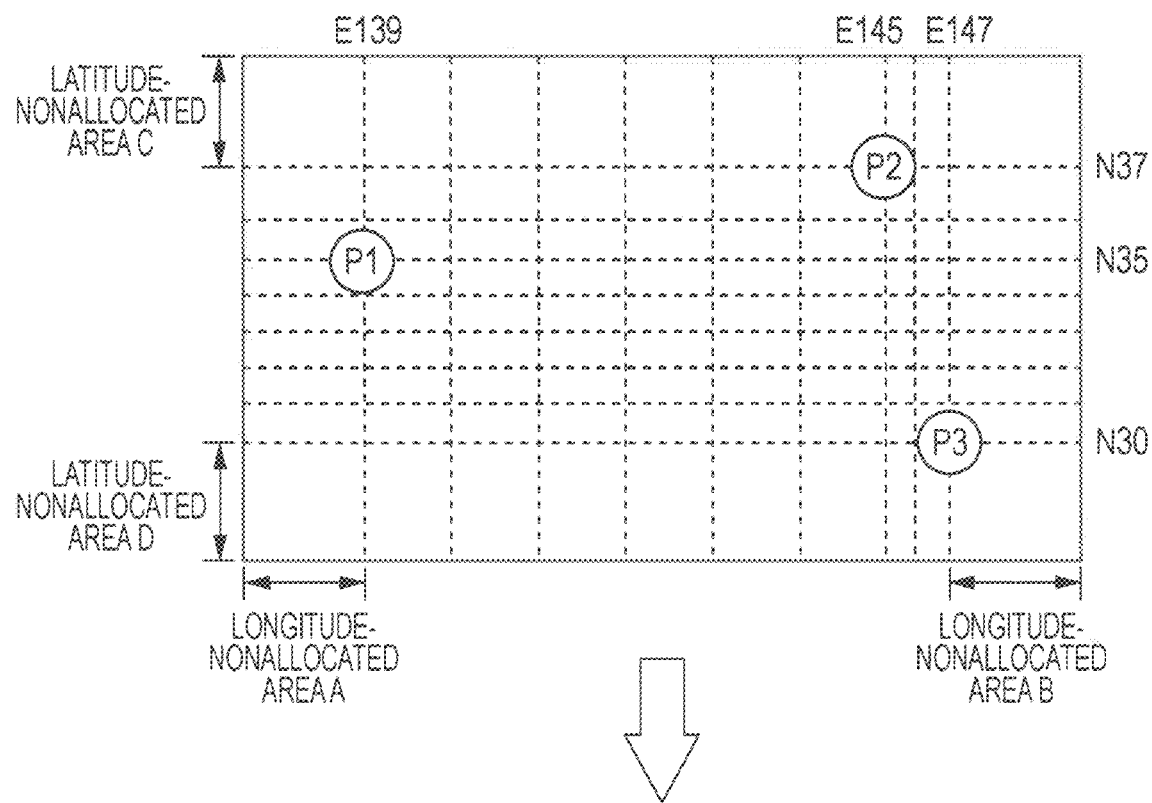
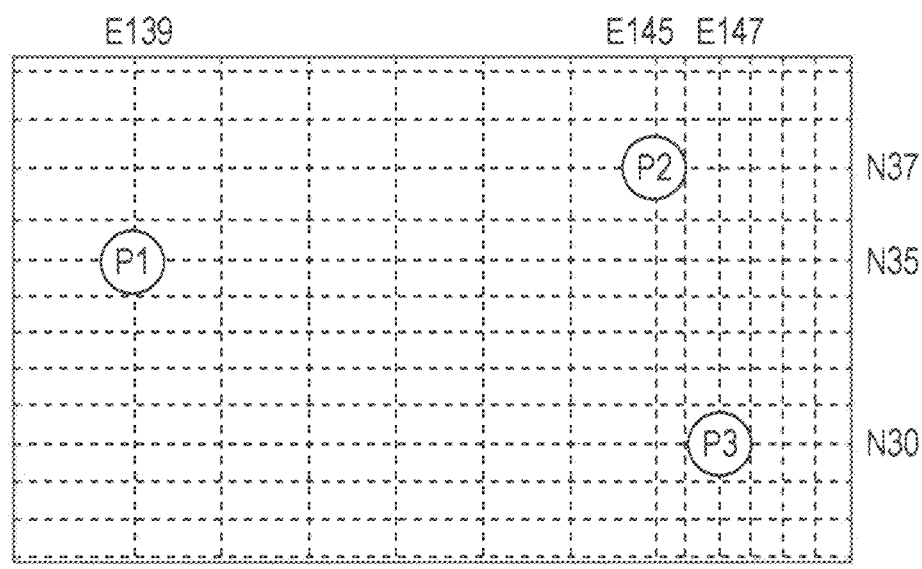

INFORMATION PROCESSING APPARATUS, PROGRAM, INFORMATION PROCESSING METHOD, AND MAP DATA

BACKGROUND OF THE INVENTION

1. Field of the Invention

The present invention relates to an information processing apparatus, a program, an information processing method, and map data.

2. Description of the Related Art

In recent years, a navigation apparatus that provides a user with a current position of the user and a route to the user's destination has been widely used. Storing map information that includes pieces of position information regarding plural spots, this navigation apparatus has the capability to obtain the current position of the user with the use of, for example, GPS (global positioning system) and to put a mark on a spot corresponding to the current position of the user on the map.

In addition, a deformed map that is different from an ordinary map precisely showing actual topology and that shows deformed topology can be used in the navigation system. Although this deformed map is often created by hand, the deformed map can be automatically created with the use of an ordinary map as is disclosed in Japanese Unexamined Patent Application Publication No. 2009-109643.

SUMMARY OF THE INVENTION

In the case where a deformed map is used for navigation, it is necessary that each spot on the deformed map has its own position information. Although a method to automatically create a deformed map is proposed in the related art, a method to allocate each spot on the deformed map its own position information is not proposed.

The present invention is achieved with the above-described problems borne in mind, and provides a novel and improved information processing apparatus, a program, information processing method, and map data that make it possible to allocate each spot on a deformed map its own position information.

According to an embodiment of the present invention, there is provided an information processing apparatus that includes: a position information allocation unit for allocating position information to plural spots on a deformed map; and an interpolation unit for interpolating position information of each spot on the deformed map on the basis of the position information allocated to the plural spots and locations of the plural spots on the deformed map.

In this case, the interpolation unit can interpolate a longitude of each spot between a reference spot of the plural spots and a first spot of the plural spots on the deformed map on the basis of the difference between the longitude of the reference spot and the longitude of the first spot; and can interpolate a latitude of each spot between the reference spot and a second spot of the plural spots on the deformed map on the basis of the difference between the latitude of the reference spot and the latitude of the second spot.

The interpolation unit can interpolate the longitude of each spot between the reference spot and the first spot on the deformed map so that longitude gradients between the reference spot and the first spot become uniform; and can interpolate the latitude of each spot between the reference spot and the second spot on the deformed map so that latitude gradients between the reference spot and the second spot become uniform.

The first spot can be the nearest spot in the positive longitude direction or in the negative longitude direction to the reference spot, and the second spot can be the nearest spot in the positive latitude direction or in the negative latitude direction to the reference spot.

The interpolation unit can repeats interpolation processing by selecting different spots among the plural spots one by one as the reference spot.

The information processing apparatus can further include an after-interpolation allocation unit for allocating position information to an area on the deformed map, to which position information has not been allocated by the interpolation processing performed by the interpolation unit, on the basis of an interpolation result allocated to another area situated next to the area to which position information has not been allocated.

The information processing apparatus can further include a smoothing processing unit for smoothing a difference between gradients of pieces of position information allocated to neighboring areas on the deformed map.

The information processing apparatus can have a navigation function for performing navigation with the use of the deformed map to which position information is allocated.

According to another embodiment of the present invention, there is provided a program that causes a computer to function: as a position information allocation unit for allocating position information to plural spots on a deformed map; and as an interpolation unit for interpolating position information of each spot on the deformed map on the basis of the position information allocated to the plural spots and locations of the plural spots on the deformed map. According to another embodiment of the present invention, there is provided map data of a deformed map that includes position information allocated to plural spots on the deformed map by a computer; and position information of each spot on the deformed map interpolated on the basis of the position information allocated to the plural spots and locations of the plural spots on the deformed map by a computer.

According to another embodiment of the present invention, there is provided a information processing method that includes the steps of allocating position information to plural spots on a deformed map; and interpolating position information of each spot on the deformed map on the basis of the position information allocated to the plural spots and locations of the plural spots on the deformed map.

As described above, position information can be allocated to spots on a deformed map by some embodiments of the present invention.

BRIEF DESCRIPTION OF THE DRAWINGS

FIG. 1 is an explanatory diagram showing a configuration of a navigation system according to a first embodiment of the present invention;

FIG. 2 is an explanatory diagram showing concrete examples of an ordinary map and a deformed map;

FIG. 8 is an explanatory diagram showing a concrete example of interpolation processing performed by a position information interpolation unit;

FIG. 9 is an explanatory diagram showing another concrete example of interpolation processing performed by the position information interpolation unit;

FIG. 10 is an explanatory diagram showing another concrete example of interpolation processing performed by the position information interpolation unit;

FIG. 11 is an explanatory diagram showing another concrete example of interpolation processing performed by the position information interpolation unit;

FIG. 12 is an explanatory diagram showing a concrete example of position information allocation performed by an after-interpolation allocation unit;

DESCRIPTION OF THE PREFERRED EMBODIMENTS

Figure 3:
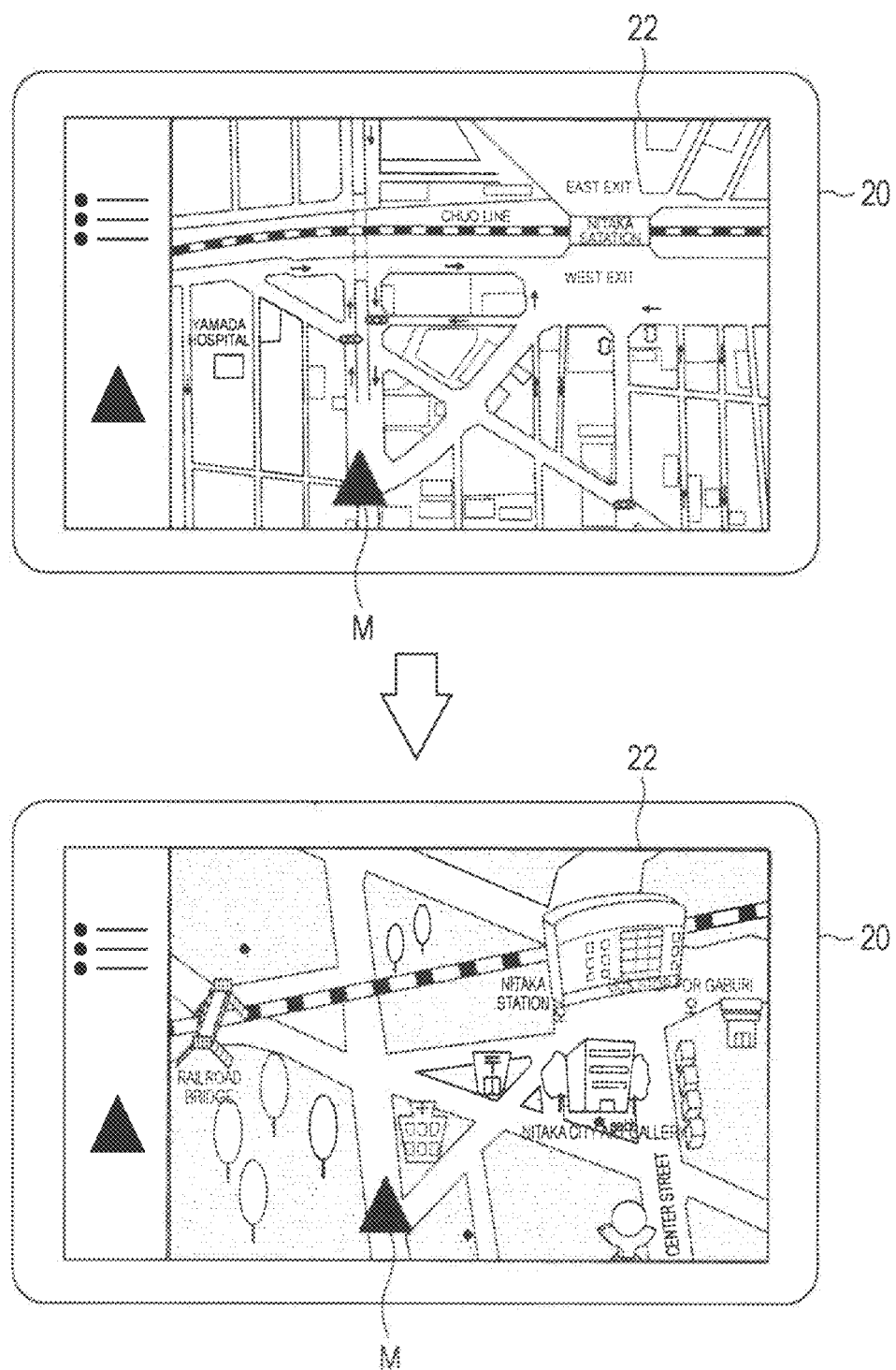
FIG. 3 is an explanatory diagram showing concrete examples of a navigation screen.

Embodiments of the present invention will be described hereinafter with reference to the attached drawings. In both this specification and the attached drawings, components that have the same functions are given the same reference numerals, and detail descriptions thereof are given only once.

Description about the embodiments of the present invention will be made regarding the following subjects in this order.

1. First embodiment of the present invention
  1-1. Configuration of navigation system
  1-2. Configuration of PND
  1-3. Configuration of information processing apparatus
    (Initial allocation unit 112)
    (Position information interpolation unit 114)
    (After-interpolation allocation unit 116)
    (Smoothing processing unit 118)
  1-4. Operation of information processing apparatus
2. Second embodiment of the present invention
3. Third embodiment of the present invention
4. Conclusion <1. First Embodiment of the Present Invention>

(1-1. Configuration of Navigation System)

Firstly, a navigation system 1 according to a first embodiment of the present invention will be described with reference to FIG. 1 to FIG. 3.

FIG. 1 is an explanatory diagram showing a configuration of a navigation system 1 according to a first embodiment of the present invention. As shown in FIG. 1, the navigation system 1 according to the first embodiment includes an information processing apparatus 10 and a PND (personal navigation device) 20.

The PND 20 is a navigation apparatus having a navigation function, and is equipped with a display unit 22, a cradle 24, and an adhesive disc 26. The cradle 24 is fixed to a dashboard of a vehicle via the adhesive disc 26, and is mechanically and electrically connected to the PND 20. Therefore, the PND 20 is operable with the use of electricity fed from the vehicle via the cradle 24. In addition, the PND 20 has a built-in battery, so that the PND 20 is operable with the use of electricity fed from the built-in battery when removed from the cradle 24.

This PND 20 has a current-position acquisition function. In addition, because the PND 20 stores ordinary map data for accurately displaying actual topology, the PND 20 can display an ordinary map onto which current position information is superimposed on the display unit 22.

In addition, the PND 20 obtains map data for a deformed map from the information processing apparatus 10. For example, the PND 20 can obtain map data for a deformed map from the information processing apparatus 10 via wire communication or wireless communication. Alternatively, the PND 20 can obtain map data for a deformed map via a connection to a recording medium in which the map data for the deformed map are stored. An ordinary map and a deformed map will be explained in comparison with each other with reference to FIG. 2 below.

FIG. 2 is an explanatory diagram showing concrete examples of an ordinary map and a deformed map below. A concrete example of the ordinary map is shown in the upper part of FIG. 2, and a concrete example of the deformed map is shown in the lower part of FIG. 2. As shown in FIG. 2, the ordinary map is a map that accurately displays actual topology, while the deformed map is a map that displays deformed topology.

In this embodiment of the present invention, position information is allocated to spots on the deformed map by the information processing apparatus 10. Therefore, by treating the deformed map in a similar way to the ordinary map, the deformed map can be also utilized for navigation as shown in FIG. 3.

FIG. 3 is an explanatory diagram showing concrete examples of a navigation screen. After obtaining current position information, the PND 20 according to this embodiment can display a current position mark M on a spot on the ordinary map where the current position information is set as shown in the upper part of FIG. 3. In a similar way, after obtaining current position information, the PND 20 according to this embodiment can display a current position mark M on a spot on the deformed map where the current position information is set as shown in the lower part of FIG. 3.

In addition, the PND 20 according to this embodiment can display route assistance as well as POI (point of interest) information on the deformed map. A configuration of such a PND 20 and a configuration of the information processing apparatus 10 that allocates position information to the spots on the deformed map will be described in detail hereinafter.

(1-2. Configuration of PND)

Figure 4:
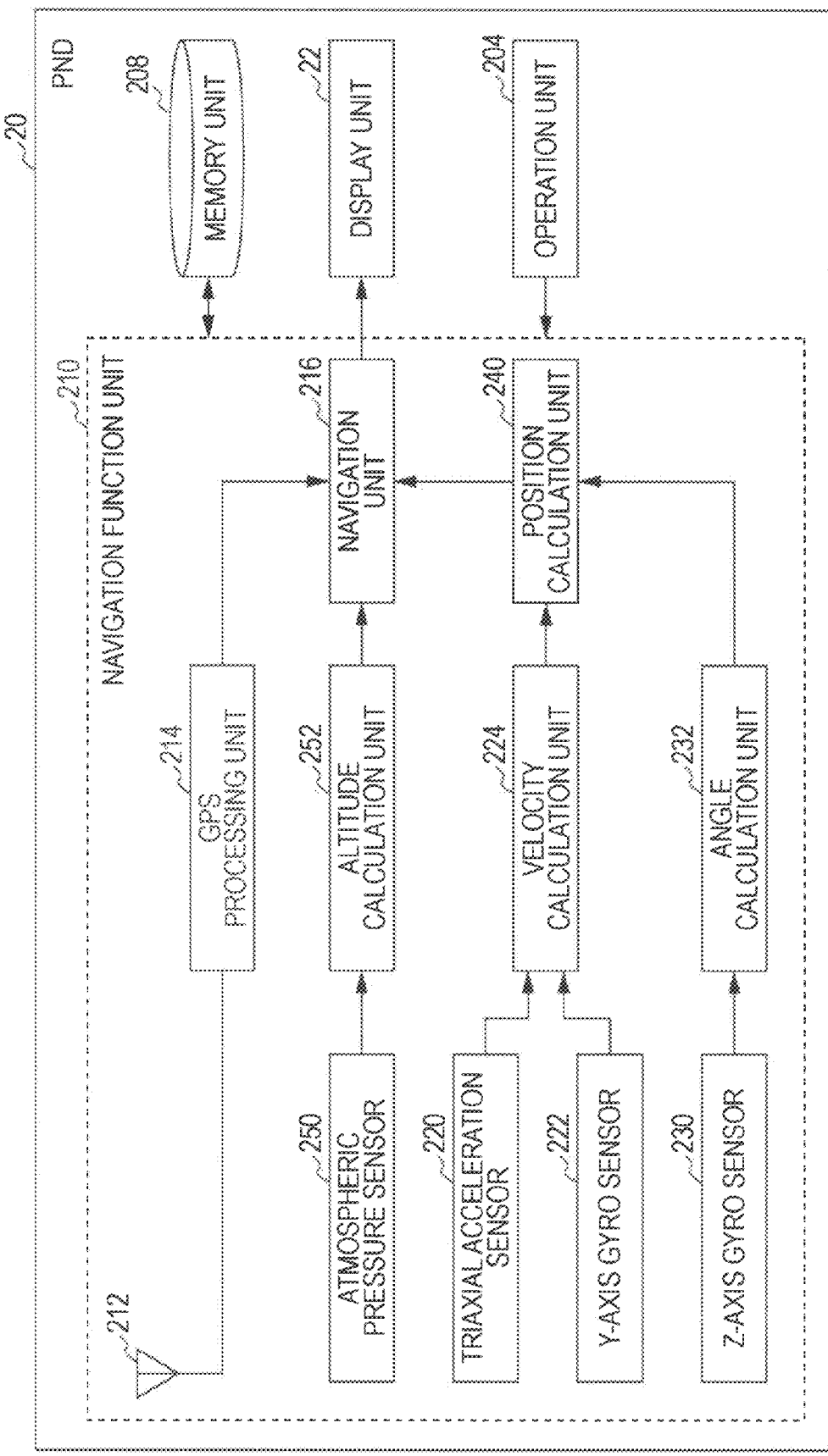
FIG. 4 is a functional block diagram showing a configuration of a PND according to the first embodiment of the present invention.

FIG. 4 is a functional block diagram showing a configuration of a PND according to this embodiment of the present. As shown in FIG. 4, the PND 20 is equipped with the display unit 22, an operation unit 204, a memory unit 208, and a navigation function unit 210.

The operation unit 204 detects a user's operation and sends contents of the user's operation to the navigation function unit 210. The contents of the user's operation is, for example, destination setting, map scaling, current position display, audio guidance setting, and screen display setting.

A touch panel or a touch screen that is integrated with the display unit 22 as an all-in-one unit can be used as this operation unit 204. Alternatively, the operation unit 204 can be composed of physical components such as buttons, switches, levers, and/or a dial that are disposed separately from the display unit 22. As another alternative device, the operation unit 204 can be a signal receiving unit that detects signals that are transmitted from a remote controller and indicate the contents of the user's operation.

The memory unit 208 stores a program used for the PND 20 to operate, and the map data of the deformed map obtained from the information processing apparatus 10. A storage medium such as a nonvolatile memory, a magnetic disk, an optical disc, or an MO (magneto-optical) disc can be used as this memory unit 208. An EEPROM (electrically erasable programmable read-only memory), or an EPROM (erasable programmable ROM) can be used as a nonvolatile memory, for example. A hard disk, or a disk-shaped magnetic disk can be used as a magnetic disk. A CD (compact disc), a DVD-R (digital versatile disc-recordable), or a BD (Blu-ray Disc™) can be used as an optical disc.

The navigation function unit 210 is configured to realize a navigation function, and includes a GPS antenna 212, a GPS processing unit 214, a navigation unit 216, a triaxial acceleration sensor 220, a Y-axis gyro sensor 222, a velocity calculation unit 224, a Z-axis gyro sensor 230, an angle calculation unit 232, a position calculation unit 240, an atmospheric pressure sensor 250, and an altitude calculation unit 252.

Among the above-cited devices, the GPS processing unit 214, the navigation unit 216, the angle calculation unit 232, the position calculation unit 240, the altitude calculation unit 252, and the like can be built with the use of a CPU (central processing unit).

The GPS antenna 212 receives GPS signals transmitted from artificial satellites orbiting around the earth, and sends the received GPS signals to the GPS processing unit 214. The GPS signals include orbit information regarding orbits of the artificial satellites, information regarding signal-transmission dates, and the like.

The GPS processing unit 214 calculates positions of the artificial satellites with the use of orbit information included in the GPS signals. Next, the GPS processing unit 214 calculates a three-dimensional current position by solving simultaneous equations on the basis of the positions of the artificial satellites, and a difference between the transmission date and the reception date of each GPS signal.

The navigation unit 216 performs navigation on the basis of the current position calculated by the GPS processing unit 214 using an ordinary map or a deformed map. For example, the navigation unit 216 reads out map data of the deformed map from the memory unit 208, creates a deformed map image including the current position, and superimposes a current position mark onto the deformed map image.

On the other hand, if it is difficult for the GPS receiving unit 212 to receive the GPS signals from the artificial satellites, the GPS processing unit 214 may not be able to calculate the current position on the basis of the GPS signals. In this case, the navigation unit 216 performs navigation with the use of a current position obtained from other methods. For example, the navigation unit 216 can perform navigation with the use of a current position obtained by using the following sensors and calculation units.

Figure 5:
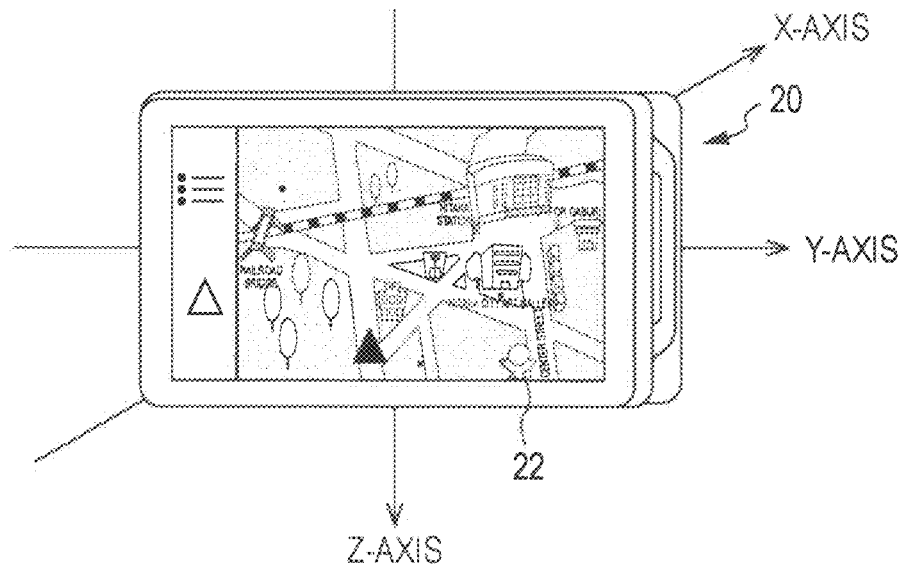
FIG. 5 is an explanatory diagram showing a coordination system regarding the PND.

The triaxial acceleration sensor 220 detects an acceleration $\alpha x$ along the X-axis, an acceleration $\alpha y$ along the Y-axis, and an acceleration $\alpha z$ along the Z-axis with the use of a sampling frequency of 50 Hz, where the X-axis, Y-axis, and Z-axis are shown in FIG. 5. Here, as shown in FIG. 5, it is supposed that the positive direction of the X-axis coincides with the traveling direction of a PND or a vehicle, the Y-axis is a horizontal axis perpendicular to the X-axis, and the Z-axis is a vertical axis perpendicular to the X-axis.

The Y-axis gyro sensor 222 detects a pitch rate $\omega y$ that is an angular velocity around the Y-axis, for example, with the use of a sampling frequency of 50 Hz.

The velocity calculation unit 224 calculates the velocity V in the traveling direction on the basis of the acceleration $\alpha z$ along the Z-axis detected by the triaxial acceleration sensor 220 and the pitch rate $\omega y$ detected by the Y-axis gyro sensor 222 with the use of the following equation 1. This calculation is performed, for example, 50 times per second.

$$V = \frac{\alpha_z}{\omega_y} \qquad \text{(equation 1)}$$

The Z-axis gyro sensor 230 detects a yaw rate $\omega z$ that is an angular velocity around the Z-axis when the PND 20 or the vehicle is turning counterclockwise, for example, with the use of a sampling frequency of 50 Hz.

The angle calculation unit 232 calculates a turning angle $\theta$ of the PND 20 or the vehicle by accumulating products obtained by multiplying the yaw rates oz detected by the Z-axis gyro sensor 230 by the sampling period (0.02 second, for example).

The position calculation unit 240 calculates a displacement magnitude from a previously calculated position to a current position on the basis of the velocity V in the traveling direction calculated by the velocity calculating unit 224 and the turning angle $\theta$ calculated by the angle calculation unit 232. Subsequently, the position calculation unit 240 calculates the current position by adding the displacement magnitude to the previously calculated position.

The atmospheric pressure sensor 250 detects an ambient atmospheric pressure with the use of, for example, a sampling frequency of 50 Hz. The altitude calculation unit 252 calculates a current altitude on the basis of the atmospheric pressure detected by the atmospheric pressure sensor 25.

The navigation unit 216 can perform navigation on the ordinary map or on the deformed map with the use of the current position calculated by the position calculation unit 240 and the current altitude calculated by the altitude calculation unit 252 as described above.

A method for obtaining a current position and the like is not limited to the above-described method that utilizes GPS positioning or a variety of sensors. As one example of alternative methods, the current position can be obtained by using signal intensities of WiFi radio waves transmitted from base stations of a wireless LAN. To put it concretely, it is possible that, after estimating distances from plural base stations by using intensities of received signals of WiFi radio waves transmitted from the plural base stations, the PND 20 obtains the current position on the basis triangular surveying with the use of the distances from the base stations and positions of the base stations.

(1-3. Configuration of Information Processing Apparatus)

In the above description, the configuration of the PND 20 according to the first embodiment of the present invention has been explained. The configuration of the information processing apparatus 10 that allocates position information to spots on a deformed map will be described hereinafter. Although a PC (personal computer) is used as an example of the information processing apparatus 10 in FIG. 1, the information processing apparatus 10 is not limited to such a PC. For example, consumer apparatuses such as home image processing devices (a DVD recorder, video electric appliances (a DVD recorder, a video cassette recorder, and the like), mobile devices, or industrial apparatuses can be used as the information processing apparatus 10.

Figure 6:
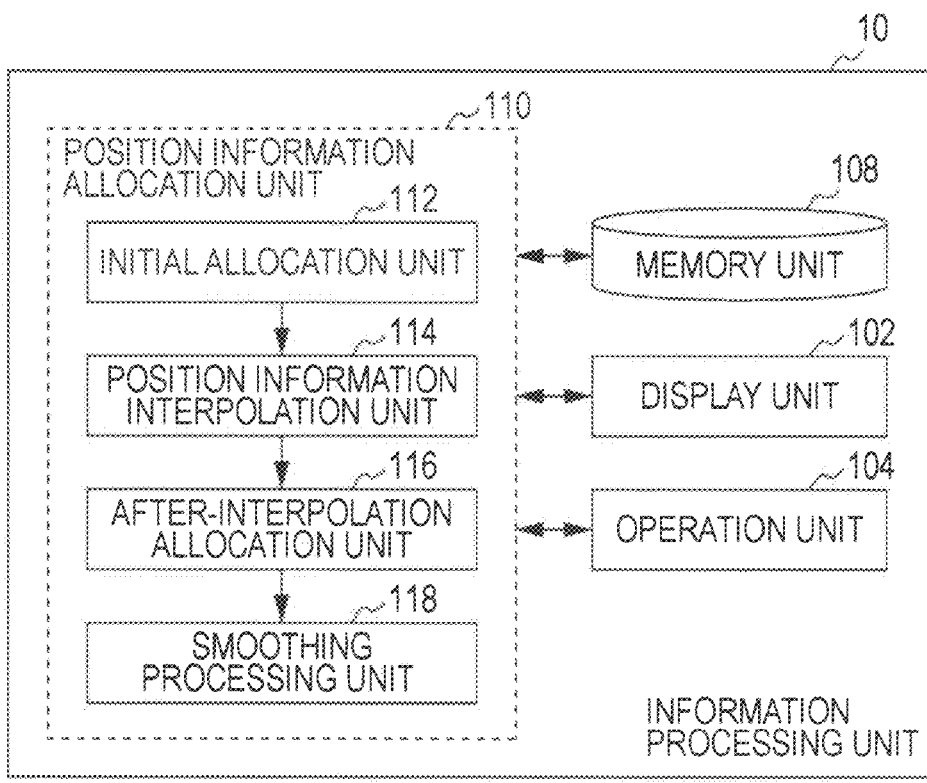
FIG. 6 is an explanatory diagram showing a configuration of an information processing apparatus according to the first embodiment of the present invention.

FIG. 6 is an explanatory diagram showing a configuration of the information processing apparatus 10 according to the first embodiment of the present invention. As shown in FIG. 6, the information processing apparatus 10 according to this embodiment includes a display unit 102, an operation unit 104, a memory unit 108, and a position information allocation unit 110. Here, the position information allocation unit 110 can be realized, for example, by a CPU.

The display unit 102 displays a display screen created by the information processing apparatus 10. A CRT (cathode ray tube) display device, a liquid crystal display (LCD) device, or an OLED (organic light emitting diode) device can be used as this display unit 102.

The operation unit 104 detects a user's operation and sends contents of the user's operation to the position information allocation unit 110. This operation unit 104 can be, for example, a mouse, a keyboard, a touch panel, buttons, a microphone, switches, and/or levers.

The memory unit 108 stores a program used for the information processing apparatus 10 to operate, and map data of the deformed map to which position information has not been allocated yet. In this case, map data that are created by the information processing apparatus 10 or map data obtained from an external apparatus can be used as the map data of the deformed map to which position information has not been allocated yet. In addition, a storage medium such as a non-volatile memory, a magnetic disk, an optical disc, or an MO (magneto-optical) disc can be used as this memory unit 108.

The position information allocation unit 110 is configured to allocate position information to spots on the deformed map, and includes an initial allocation unit 112, a position information interpolation unit 114, an after-interpolation allocation unit 116, and a smoothing processing unit 118.

(Initial Allocation Unit 112)

The initial allocation unit 112 is a unit that allocates position information to plural spots on a deformed map. The initial allocation unit 112 can be configured in such a way that, when plural spots on a deformed map, and plural spots on an ordinary map corresponding to the plural spots on the deformed map are selected by a user after the deformed map and the ordinary map are displayed by the display unit 102, pieces of position information set to the plural spots on the ordinary map are respectively allocated to the corresponding plural spots on the deformed map. An operation of the initial allocation unit 112 will be concretely described with reference to FIG. 7 below.

Figure 7:
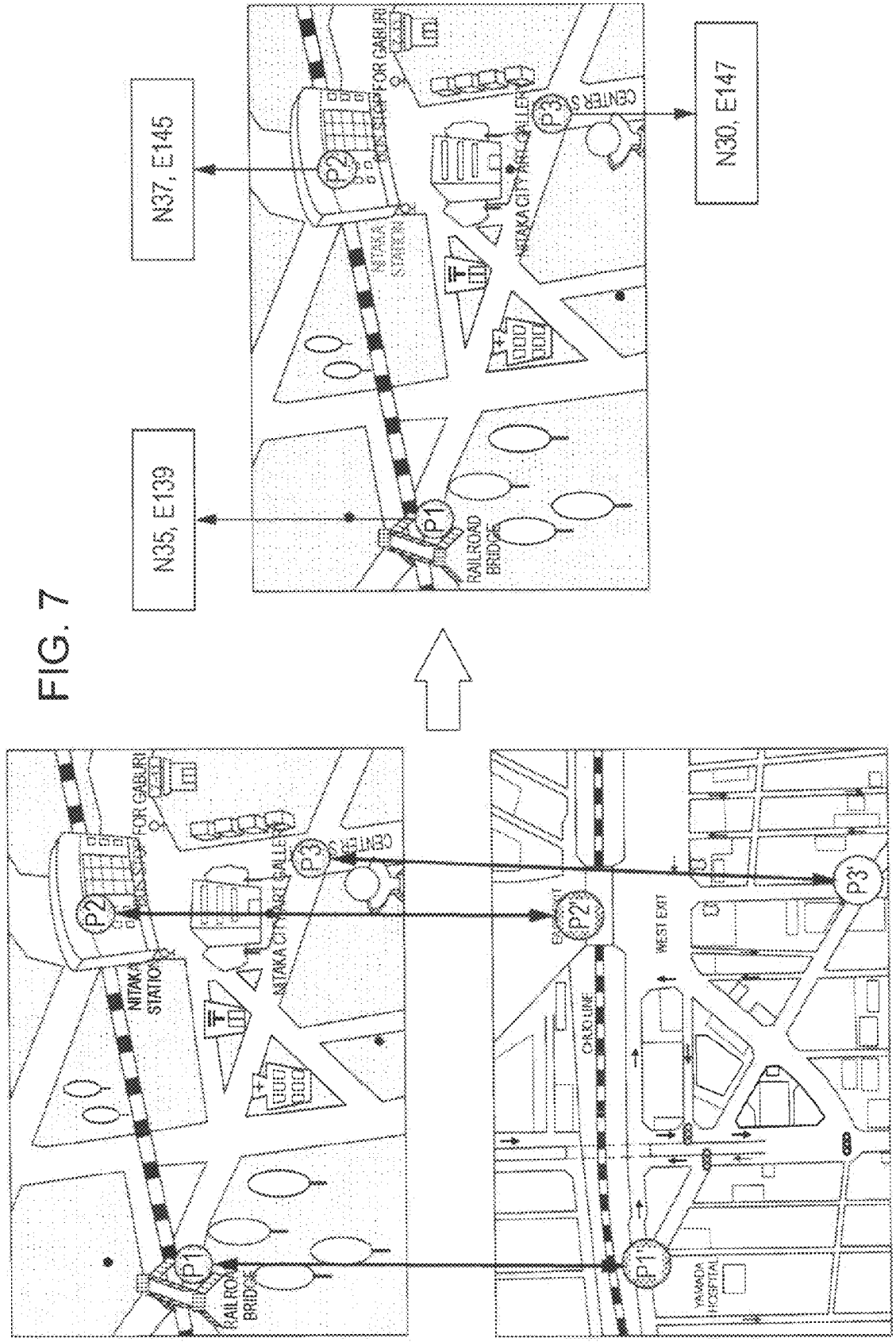
FIG. 7 is an explanatory diagram showing an example of position information allocation performed by an initial allocation unit.

FIG. 7 is an explanatory diagram showing an example of position information allocation performed by the initial allocation unit 112. As shown in FIG. 7, when a spot P1 on a deformed map, and a spot P1' on an ordinary map corresponding to the spot P1 on the deformed map are selected by a user, the initial allocation unit 112 allocates position information (N35, E139) of the spot P1' on the ordinary map to the spot P1 on the deformed map.

In addition, when a spot P2 on the deformed map, and a spot P2' on the ordinary map corresponding to the spot P2 on the deformed map are selected by the user, the initial allocation unit 112 allocates position information (N37, E145) of the spot P2' on the ordinary map to the spot P2 on the deformed map.

In a similar way, when a spot P3 on the deformed map, and a spot P3' on the ordinary map corresponding to the spot P3 on the deformed map are selected by the user, the initial allocation unit 112 allocates position information (N30, E147) of the spot P3' on the ordinary map to the spot P3 on the deformed map.

Although the initial allocation unit 112 allocates position information to three spots on the deformed map in the above example, the number of spots to which position information is allocated is not limited to the number of the spots in this example. Although it is necessary that the number of spots to which the initial allocation unit 112 allocates position information is at least two, the initial allocation unit 112 can allocate position information to more than two, for example, to five spots or to ten spots.

Although the initial allocation unit 112 allocates position information to plural spots on the deformed map on the basis of the user's operation in the above example, the initial allocation unit 112 can allocate position information on the basis of other methods. For example, after detecting a spot on the ordinary map corresponding to a spot on the deformed map by examining the relationship between spots on the deformed map and spots on the ordinary map, the initial allocation unit 112 can allocate position information of the corresponding spot on the ordinary map to the spot on the deformed map.

To put it concretely, the initial allocation unit 112 can detect an intersection on the ordinary map corresponding to an intersection on the deformed map by examining the relationship between roads on the deformed map and roads on the ordinary map. In addition, the initial allocation unit 112 can detect a spot on the ordinary map corresponding to a spot having a certain piece of POI information on the deformed map by examining the relationship between the POI information of the deformed map and POI information on the ordinary map.

(Position Information Interpolation Unit 114)

The position information interpolation unit 114 interpolates position information of each spot on the deformed map on the basis of the position information allocated to plural spots on the deformed map and locations of the plural spots on the deformed map.

To put it in detail, the position information interpolation unit 114 selects a reference point and a first spot that is the nearest spot in the right direction (in the positive longitude direction) or in the left direction (in the negative longitude direction) to the reference spot among plural spots. Next, the interpolation unit 114 interpolates the longitude of each spot between the reference spot and the first spot on the deformed map so that longitude gradients between the reference spot and the first spot become uniform. The longitude gradient is the longitude variation per unit length in the longitude direction. In addition, the position information interpolation unit 114 can select a spot near to the reference spot on the basis of locations of the plural spots on the deformed map, or can select on the basis of the position information allocated by the initial allocation unit 112.

In a similar way, the position information interpolation unit 114 selects a reference point and a second spot that is the nearest spot in the up direction (in the positive latitude direction) or in the down direction (in the negative latitude direction) to the reference spot among the plural spots. Next, the interpolation unit 114 interpolates the latitude of each spot between the reference spot and the second spot on the deformed map so that latitude gradients between the reference spot and the second spot become uniform. The latitude gradient is a latitude variation per unit length in the latitude direction.

Subsequently, the position information interpolation unit 114 repeats the interpolation processing by selecting different spots among the plural spots one by one as the reference spot.

The interpolation processing performed by the position information interpolation unit 114 will be described hereinafter with reference to FIG. 8 to FIG. 11.

FIG. 8 to FIG. 11 are explanatory diagrams showing concrete examples of interpolation processing performed by the position information interpolation unit 114. As shown in the upper part of FIG. 8, it is supposed that pieces of position information regarding spots P1, P2 and P3 are allocated by the initial allocation unit 112, and that the position information interpolation unit 114 first selects the spot P1 as a reference spot.

The position information interpolation unit 114 selects the spot P2 that is the nearest spot to the spot P1 in the right direction, and interpolates the longitude of each spot between the spot P1 and the spot P2 on the deformed map so that longitude gradients between the spot P1 and the spot P2 become uniform. In this case, the longitude gradients between the spot P1 and the spot P2 can be each set to be a value obtained by dividing the difference between the longitudes of the spot P1 and the spot P2, that is, "6 degrees", by the distance between the spot P1 and the spot P2 in the longitude direction (or the number of pixels therebetween).

As a result, as shown in the lower part of the FIG. 8, longitude lines with a 1 degree interval therebetween uniformly divide the distance between the spot P1 and the spot P2 in the longitude direction on the deformed map. In addition, taking pixels or pixel blocks composed of plural pixels as spots on the deformed map, the position information interpolation unit 114 can interpolate position information regarding the pixels or the pixel blocks.

If there is a spot to which position information is allocated to the left of the spot P1, the position information interpolation unit 114 selects the spot and performs interpolation. In FIG. 8, there is no spot to which position information is allocated to the left of the spot P1, so the position information interpolation unit 114 does not perform interpolation regarding the area to the left of the spot P1.

Next, as shown in FIG. 9, the position information interpolation unit 114 selects the spot P2 that is the nearest to the spot P1 in the up direction, and interpolates the latitude of each spot between the spot P1 and the spot P2 on the deformed map so that latitude gradients between the spot P1 and the spot P2 become uniform.

In this case, the latitude gradients between the spot P1 and the spot P2 can be each set to be a value obtained by dividing the difference between the latitudes of the spot P1 and the spot P2, that is, "2 degrees", by the distance between the spot P1 and the spot P2 in the latitude direction. As a result, as shown in the lower part of the FIG. 9, latitude lines with a 1 degree interval therebetween uniformly divide the distance between the spot P1 and the spot P2 in the latitude direction on the deformed map.

Next, as shown in FIG. 10, the position information interpolation unit 114 selects the spot P3 that is the nearest to the spot P1 in the down direction, and interpolates a latitude of each spot between the spot P1 and the spot P2 on the deformed map so that latitude gradients between the spot P1 and the spot P3 become uniform.

In this case, the latitude gradients between the spot P1 and the spot P3 can be set to be a value obtained by dividing the difference between the latitudes of the spot P1 and the spot P3, that is, "5 degrees", by the distance between the spot P1 and the spot P3 in the latitude direction. As a result, as shown in the lower part of FIG. 10, latitude lines with a 1 degree interval therebetween uniformly divide the distance between the spot P1 and the spot P3 in the latitude direction on the deformed map.

Subsequently, as shown in FIG. 11, the position information interpolation unit 114 selects the spot P2 as the reference spot instead of the spot P1, and repeats similar interpolation processing. To put it concretely, the position information interpolation unit 114 selects the spot P3 that is the nearest to the spot P2 in the right direction, and interpolates a longitude of each spot between the spot P2 and the spot P3 on the deformed map so that longitude gradients between the spot P2 and the spot P3 become uniform.

In this case, the longitude gradient between the spot P2 and the spot P3 can be set to be a value obtained by dividing the difference between the longitudes of the spot P2 and the spot P3, that is, "2 degrees", by the distance between the spot P2 and the spot P3 in the longitude direction (or the number of pixels therebetween). As a result, as shown in the lower part of FIG. 11, longitude lines with a 1 degree interval therebetween uniformly divide the distance between the spot P2 and the spot P3 in the longitude direction on the deformed map.

In this case, because interpolation processing regarding the left side and the lower side of the reference spot P2 has already been finished, and there is no spot to which position information is allocated to the upper side of the reference spot P2, the position information interpolation unit 114 does not perform interpolation processing regarding the left side, the lower side, and upper side of the spot P2.

Subsequently, the position information interpolation unit 114 selects the spot P3 as the reference spot. However, because interpolation processing regarding the left side and the upper side of the reference spot P3 has already been finished, and there is no spot to which position information is allocated to the lower side and the right side of the reference spot P3, the position information interpolation unit 114 does not perform interpolation processing regarding all sides of the spot P3.

(After-Interpolation Allocation Unit 116)

The after-interpolation allocation unit 116 allocates position information to an area on the deformed map, to which position information has not been allocated by the interpolation processing performed by the position information interpolation unit 114, on the basis of an interpolation result allocated to another area situated next to the area to which position information has not been allocated. Position information allocation performed by the after-interpolation allocation unit 116 will be described in detail hereinafter with reference to FIG. 12.

FIG. 12 is an explanatory diagram showing a concrete example of position information allocation performed by an after-interpolation allocation unit 116. As shown in the upper part of FIG. 12, an area A to the left side of the spot P1, and an area B to the right side of the spot P3 are longitude-nonallocated areas that are areas to which longitudes have not been allocated yet.

Therefore, the after-interpolation allocation unit 116 allocates longitudes to the longitude-nonallocated area A on the basis of the longitude gradients of the area between the spot P1 and the spot P2 lying next to the area A. As a result, as shown in the lower part of FIG. 12, a longitude line with a 1 degree interval is allocated to the longitude-nonallocated area A just like the longitude lines with a 1 degree interval therebetween are allocated to the area between the spot P1 and the spot P2.

In a similar way, the after-interpolation allocation unit 116 allocates longitudes to the longitude-nonallocated area B on the basis of the longitude gradients of the area between the spot P2 and the spot P3 lying next to the area B. As a result, as shown in the lower part of FIG. 12, longitude lines with a 1 degree interval are allocated to the longitude-nonallocated area B just like the longitude lines with a 1 degree interval therebetween are allocated to the area between the spot P2 and the spot P3.

In addition, as shown in the upper part of FIG. 12, an area C to the upper side of the spot P2, and an area D to the lower side of the spot P3 are latitude-nonallocated areas that are areas to which latitudes have not been allocated yet. Therefore, the after-interpolation allocation unit 116 allocates latitudes to the latitude-nonallocated area C on the basis of the latitude gradients of the area between the spot P2 and the spot P1 lying next to the area C. As a result, as shown in the lower part of FIG. 12, latitude lines with a 1 degree interval are allocated to the longitude-nonallocated area C just like the latitude lines with a 1 degree interval therebetween are allocated to the area between the spot P1 and the spot P2.

In a similar way, the after-interpolation allocation unit 116 allocates latitudes to the latitude-nonallocated area D on the basis of the latitude gradients of the area between the spot P1 and the spot P3 lying next to the area D. As a result, as shown in the lower part of FIG. 12, latitude lines with a 1 degree interval are allocated to the longitude-nonallocated area D just like the latitude lines with a 1 degree interval therebetween are allocated to the area between the spot P1 and the spot P3.

As described above, position information is allocated to the areas, to which position information has not been allocated by the position information interpolation unit 114, by the after-interpolation allocation unit 116. As a result, it becomes possible that position information is allocated to all the areas on the deformed map.

(Smoothing Processing Unit 118)

The smoothing processing unit 118 smoothes a difference between gradients of pieces of position information allocated to neighboring areas on the deformed map. A smoothing process for smoothing the difference between the gradients performed by the smoothing processing unit 118 will be described in detail hereinafter with reference to FIG. 13.

Figure 13:
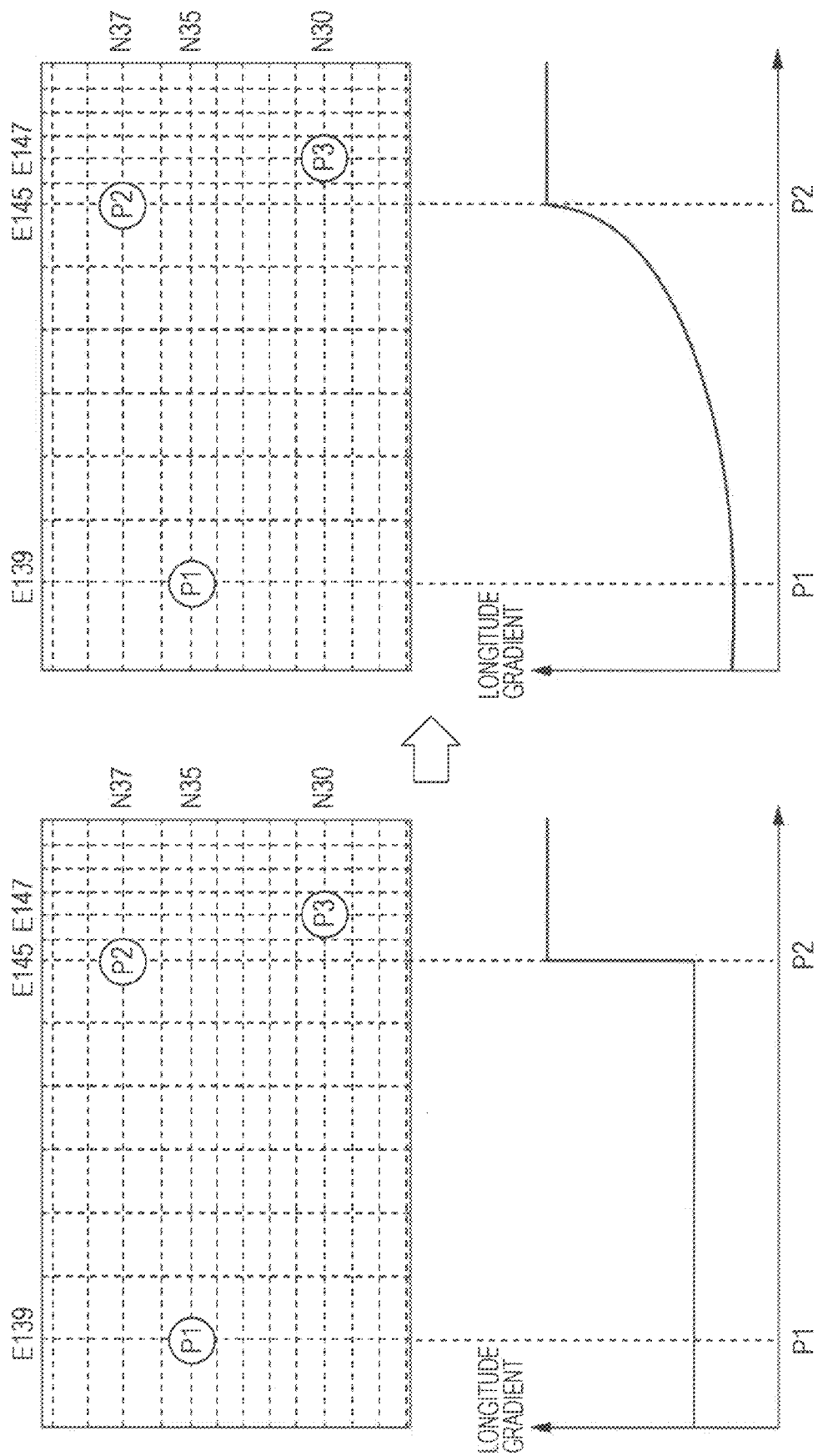
FIG. 13 is an explanatory diagram showing a concrete example of smoothing processing performed by a smoothing processing unit.

FIG. 13 is an explanatory diagram showing a concrete example of smoothing processing performed by the smoothing processing unit 118. In an example shown in the left part of FIG. 13, a longitude gradient vastly varies at the spot P2 as a boundary point. In an actual deformed map, however, it is believed that there are few cases where a longitude gradient (or a latitude gradient) vastly varies at a spot as a boundary point, and that the longitude gradient (or the latitude gradient) gradually varies.

Therefore, the smoothing processing unit 118 smoothes the difference between the longitude gradients of the area between the spot P1 and the spot P2 and the longitude gradients of the area to the right side of the spot P2 by gradually increasing the longitude gradients of the area between the spot P1 and the spot P2 as shown in the right part of FIG. 13. In this way, position information of each spot on the deformed map can be properly modified.

In this case, the smoothing processing unit 118 can detect a spot where the gradient variation is steep on the basis of the contents of pieces of processing performed by the position information interpolation unit 114 and the after-interpolation allocation unit 116, or can detect a spot where the gradient variation is steep on the basis of the position information allocated to the deformed map.

(1-4. Operation of Information Processing Apparatus)

In the above description, the configuration of the information processing apparatus 10 according to the first embodiment has been explained with reference to FIGS. 6 to 13. An operation of the information processing apparatus 10 according to the first embodiment will be described with reference to FIG. 14 hereinafter.

Figure 14:
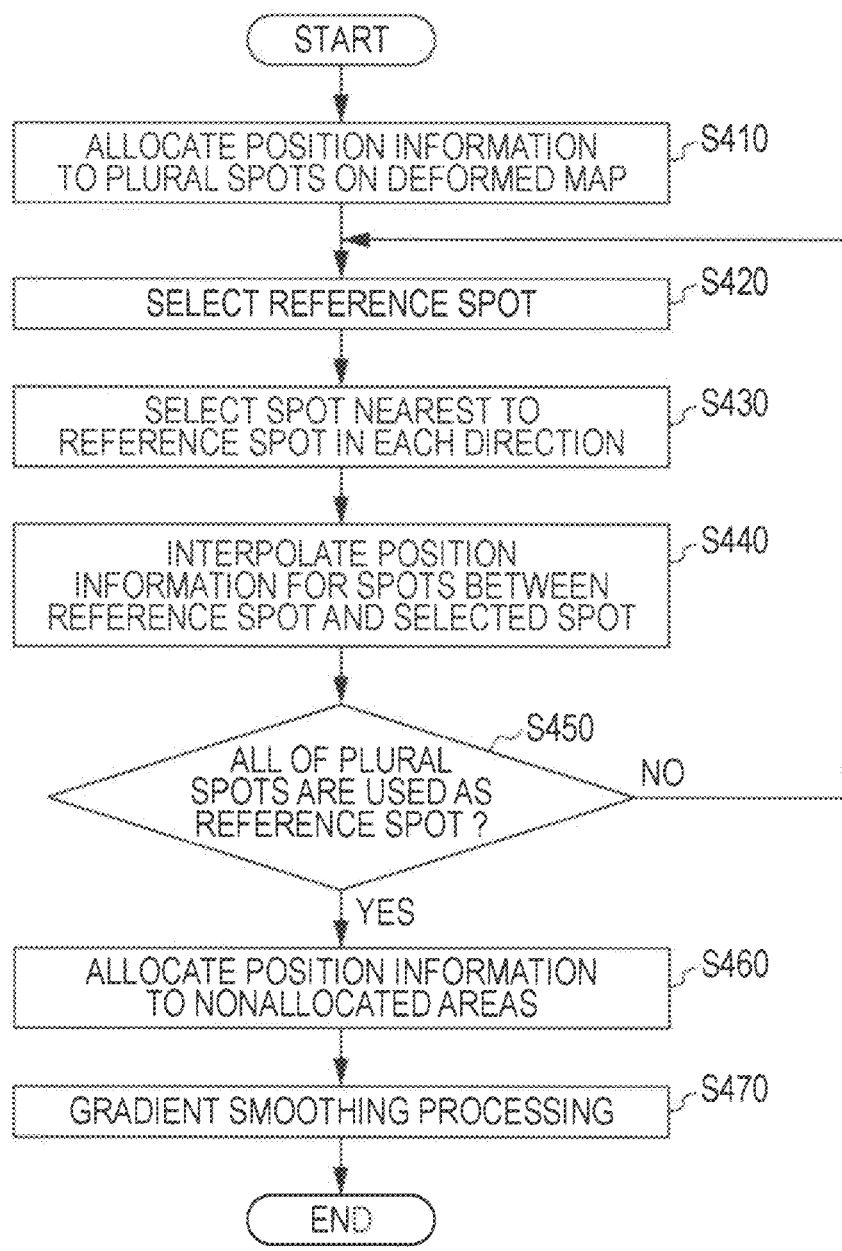
FIG. 14 is a flowchart showing an operation of the information processing apparatus according to the first embodiment of the present invention.

FIG. 14 is a flowchart showing an operation of the information processing apparatus 10 according to the first embodiment. Firstly, as shown in FIG. 14, the initial allocation unit 112 of the information processing apparatus 10 allocates position information to plural spots on a deformed map (S410).

Next, the position information interpolation unit 114 selects one of the plural spots to which position information has been allocated as a reference spot (S420). Next, the position information interpolation unit 114 selects a spot nearest to the reference spot out of the plural spots in each direction (S430). Subsequently, the position information interpolation unit 114 interpolates the longitudes or latitudes of spots between the reference spot and the selected spot on the deformed map so that the longitude gradients or the latitude gradients between the reference spot and the selected spot become uniform (S440).

Next, the position information interpolation unit 114 continues to perform the interpolation processing by selecting different spots among the plural spots one by one as the reference spot until all of the plural spots are used as the reference point (S450).

Subsequently, the after-interpolation allocation unit 116 allocates position information to an area on the deformed map, to which position information has not been allocated by the interpolation processing performed by the position information interpolation unit 114, on the basis of an interpolation result allocated to another area situated next to the area to which position information has not been allocated (S460).

In addition, the smoothing processing unit 118 smoothes a difference between gradients of pieces of position information allocated to neighboring areas on the deformed map (S470).

In the above-described manner, the information processing apparatus 10 can properly allocate position information to all the areas throughout the deformed map. As a result, the PND 20 can be adequately used for navigation that displays a current spot, a route guide, and the like on the deformed map.

<2. Second Embodiment of the Present Invention>

As described above, the PND 20 according to the first embodiment performs navigation with the use of a deformed map to spots of which position information is allocated by the information processing apparatus 10. In contrast, a PND 21 according to a second embodiment of the present invention has a function for allocating position information to spots on a deformed map as well as a navigation function. Such a configuration of the PND 21 according to the second embodiment will be described below.

Figure 15:
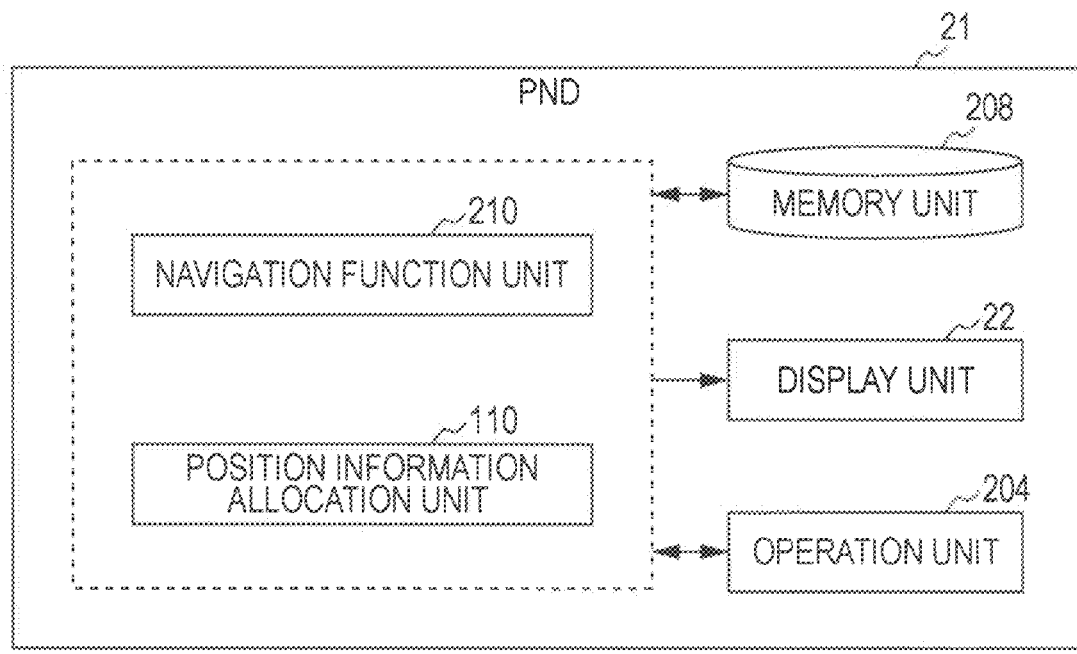
FIG. 15 is an explanatory diagram showing a configuration of a PND according to a second embodiment of the present invention.

FIG. 15 is an explanatory diagram showing a configuration of the PND 21 according to the second embodiment. As shown in FIG. 15, the PND 21 according to the second embodiment is equipped with a position information allocation unit 110 in addition to a display unit 22, an operation unit 204, a memory unit 208, and a navigation function unit 210.

Therefore, the PND 21 according to the second embodiment can perform both navigation using the navigation function unit 210 and allocation for allocating position information to spots of a deformed map using the position information allocation unit 110. The navigation function unit 210 and the position information allocation unit 110 are the same as those described in the first embodiment, and therefore detailed description is omitted.

<3. Third Embodiment of the Present Invention>

The PDN 20 and the PDN 21 described in the first embodiment and the second embodiment respectively are only examples of navigation apparatuses and a navigation apparatus is not limited to one of these examples. For example, the navigation apparatus can be a cellular phone 30 that will be described below as a third embodiment. Alternatively, although detailed explanation is omitted, the navigation apparatus can be a PHS, a portable audio playback device, a portable image processing device, a portable game machine, a portable image capturing device, or the like.

Figure 16:
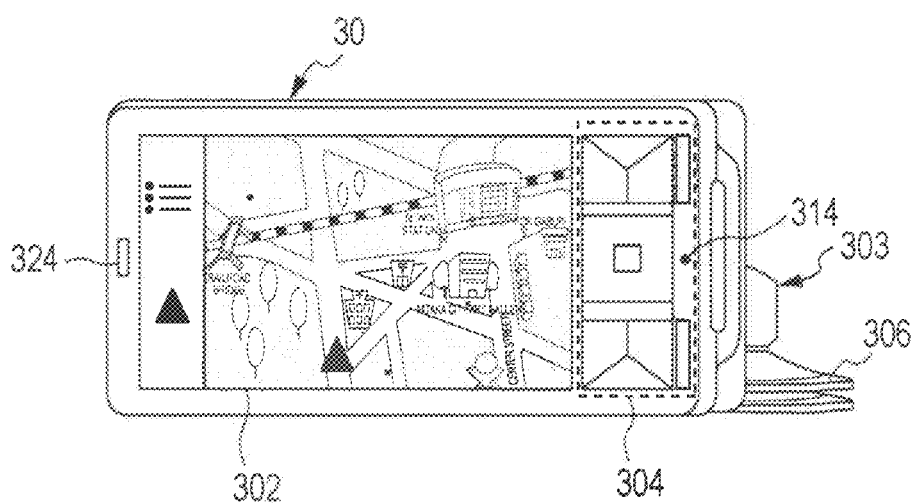
FIG. 16 is a schematic view of a cellular phone according to a third embodiment of the present invention.

FIG. 16 is a schematic view of a cellular phone 30 according to the third embodiment. As shown in FIG. 16, the cellular phone 30 according to the third embodiment is equipped with a display unit 302, a cradle 303, an operation unit 304, an adhesive disc 306, a microphone 314, and a speaker 324.

In this case, the cradle 303 is fixed to a dashboard of a vehicle via the adhesive disc 306, and is mechanically and electrically connected to the cellular phone 30 just like in the case of the PND 20 according to the first embodiment. Therefore, the cellular phone 30 is operable with the use of electricity fed from the vehicle via the cradle 303. In addition, the cellular phone 30 has a built-in battery, so that the cellular phone 30 is operable with the use of electricity fed from the built-in battery when removed from the cradle 303.

Figure 17:
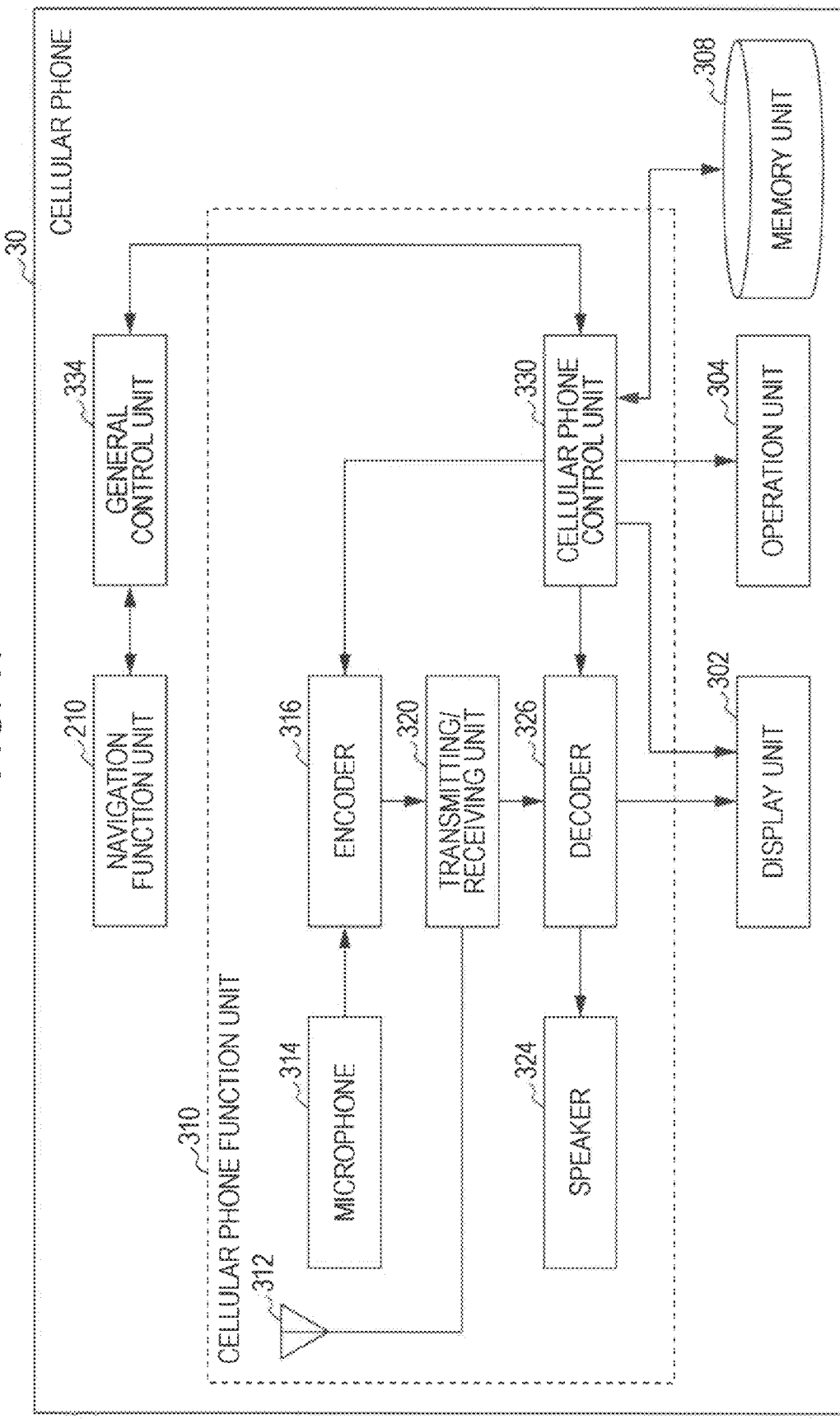
FIG. 17 is a functional block diagram showing a configuration of the cellular phone according to the third embodiment of the present invention.

FIG. 17 is a functional block diagram showing a configuration of the cellular phone 30 according to the third embodiment. As shown in FIG. 17, the cellular phone 30 according to the third embodiment is equipped with a navigation function unit 210, a display unit 302, an operation unit 304, a memory unit 308, a cellular phone function unit 310, and a general control unit 334.

Here, the cellular phone function unit 310 has a configuration to realize a communication function, an e-mail function, and the like, and includes a communication antenna 312, a microphone 314, an encoder 316, a transmitting/receiving unit 320, a speaker 324, a decoder 326, and a cellular phone control unit 330. The navigation function unit 210 is the same as that described in the first embodiment, and therefore detailed description is omitted.

The microphone 314 collects sounds, converts the sounds to audio signals and outputs the audio signals. The encoder 316 performs digital conversion and encoding on the audio signals sent from the microphone 314, and sends the audio data to the transmitting/receiving unit 320 in accordance with the control of the cellular phone control unit 330.

The transmitting/receiving unit 320 modulates the audio data sent from the encoder 316 in accordance with a predetermined formula, and wirelessly transmits the modulated audio data to a base station of the cellular phone 30 via the communication antenna 312. In addition, the transmitting/receiving unit 320 receives wireless signals via a communication antenna 312, demodulates the received signals to obtain audio data, and sends the audio data to the decoder 326.

The decoder 326 performs decoding and analog conversion on the audio data sent from the transmitting/receiving unit 320 to obtain audio signals, and sends the audio signals to the speaker 324 in accordance with the control of the cellular phone control unit 330. The speaker 324 outputs audio sounds on the basis of the audio signals fed from the decoder 326.

When an e-mail is received, the cellular phone control unit 330 causes the transmitting/receiving unit 320 to send the received e-mail data to the decoder 326, and causes the decoder 326 to decode the received e-mail data. Subsequently, the cellular phone control unit 330 causes the decoder 326 to send the decoded e-mail data to the display unit 302, and causes the display unit 302 to display the decoded e-mail data, and further causes the memory unit 308 to store the e-mail data.

When an e-mail is transmitted, the cellular phone control unit 330 causes the encoder 316 to encode the e-mail data that is sent from the operation unit 304, and causes the transmitting/receiving unit 320 to wirelessly transmit the encoded e-mail data via the communication antenna 312.

The general control unit 334 controls the above-described cellular phone function unit 310 and the navigation function unit 210. For example, the general control unit 334 can be configured in such away that, if there is a phone call when a navigation is being performed by the navigation function unit 210, the general control unit 334 switches from the navigation to a communication performed by the cellular phone function unit 310, and when the communication is over, the general control unit 334 causes the navigation function unit 210 to resume the navigation.

<4. Conclusion>

As described above, in the embodiments of the present invention, the initial allocation unit 112 allocates position information to plural spots on a deformed map. Next, the position information interpolation unit 114 interpolates position information of each spot on the deformed map on the basis of the position information allocated to the plural spots on the deformed map and locations of the plural spots on the deformed map.

In addition, in the embodiments of the present invention, the after-interpolation allocation unit 116 allocates position information to an area on the deformed map, to which position information has not been allocated by the interpolation processing performed by the position information interpolation unit 114, on the basis of an interpolation result allocated to another area situated next to the area to which position information has not been allocated. As a result, position information can be allocated to all the areas throughout the deformed map.

In addition, in the embodiments of the present invention, the smoothing processing unit 118 smoothes a difference between gradients of pieces of position information allocated to neighboring areas on the deformed map. In this way, position information of each spot on the deformed map can be properly modified.

The present application contains subject matter related to that disclosed in Japanese Priority Patent Application JP 2009-298148 filed in the Japan Patent Office on Dec. 28, 2009, the entire contents of which are hereby incorporated by reference.

Although the preferred embodiments of the present invention has been described in reference with the attached drawings, the present invention is not limited only to the above-described embodiments. It will be obvious to those skilled in the art that various modifications and alterations may occur within the scope of technological ideas of the appended claims or the equivalents thereof. Therefore, it should be understood that all these modifications and alternations fall within the technological scope of the present invention.

For example, it is not necessary that the steps in the processes performed by the information processing apparatus 10 according to this specification are performed in the time-series order described in the flowchart. The steps in the processes performed by the information processing unit 10 can be carried out in the order different from the order described in the flowchart, or the steps can be carried out in parallel if possible.

In addition, computer programs can be developed that make CPUs, ROMs, and RAMS included in a navigation apparatus such as the PND 20, the PND 21, the cellular phone 30, or in the information processing apparatus 10 to carry out functions equivalent to functions of components of the navigation apparatus or of the information processing apparatus 10. A storage medium that stores such programs can be also provided.

What is claimed is:

1. An information processing apparatus comprising:
   circuitry configured to:
   allocate position information to each of a plurality of predetermined spots on a deformed map;
   interpolate position information of each of a plurality of new spots on the deformed map on based on the position information allocated to the plurality of predetermined spots and locations of the plurality of predetermined spots on the deformed map; and
   repeat the interpolating by individually selecting a different predetermined spot, from among the plurality of predetermined spots as a reference spot.

2. The information processing apparatus according to claim 1, wherein the circuitry is further configured to
   interpolate a longitude of each new spot in the plurality of new spots that lies between the reference spot and a first predetermined spot of the plurality of predetermined spots on the deformed map based on a difference between a longitude of the reference spot and a longitude of the predetermined first spot; and
   interpolate a latitude of each new spot in the plurality of new spots that lies between the reference spot and a second predetermined spot of the plurality of predetermined spots on the deformed map based on a difference between a latitude of the reference spot and a latitude of the second predetermined spot.

3. The information processing apparatus according to claim 2, wherein the circuitry is further configured to
   interpolate the longitude of each new spot in the plurality of new spots that lies between the reference spot and the first predetermined spot on the deformed map so that longitude gradients between the reference spot and the first predetermined spot are uniform; and
   interpolate the latitude of each new spot in the plurality of new spots that lies between the reference spot and the second predetermined spot on the deformed map so that latitude gradients between the reference spot and the second predetermined spot are uniform.

4. The information processing apparatus according to claim 3, wherein the first predetermined spot is the nearest predetermined spot in a positive longitude direction or in a negative longitude direction to the reference spot, and the second predetermined spot is the nearest predetermined spot in a positive latitude direction or in a negative latitude direction to the reference spot.

5. The information processing apparatus according to claim 1, wherein the circuitry is further configured to allocate position information to an area on the deformed map, to which position information has not been allocated by the interpolating based on an interpolation result allocated to another area situated next to the area.

6. The information processing unit according to claim 5, wherein the circuitry is further configured to smooth a difference between gradients of pieces of position information allocated to neighboring areas on the deformed map.

7. The information processing apparatus according to any of claims 1-4, 5, and 6, wherein the circuitry is further configured to perform a navigation function by using the deformed map to which position information is allocated.

8. A non-transitory computer readable medium encoded with a program that causes a computer to perform a method comprising:
   allocating position information to each of a plurality of predetermined spots on a deformed map;
   interpolating position information of each of a plurality of new spots on the deformed map on based on the position information allocated to the plurality of predetermined spots and locations of the plurality of predetermined spots on the deformed map; and
   repeating the interpolating by individually selecting a different predetermined spot, from among the plurality of predetermined spots, as a reference spot.

9. An information processing method comprising:
   allocating position information to each of a plurality of predetermined spots on a deformed map;
   interpolating, by processing circuitry, position information of each of a plurality of new spots on the deformed map on based on the position information allocated to the plurality of predetermined spots and locations of the plurality of predetermined spots on the deformed map; and
   repeating the interpolating by individually selecting a different predetermined spot, from among the plurality of predetermined spots, as a reference spot.

* * * * *